United States Patent
Mizoguchi et al.

(10) Patent No.: US 11,894,560 B2
(45) Date of Patent: Feb. 6, 2024

(54) LEAD-ACID BATTERY

(71) Applicant: GS Yuasa International Ltd., Kyoto (JP)

(72) Inventors: Yasunori Mizoguchi, Kyoto (JP); Akihito Tsujinaka, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 29 days.

(21) Appl. No.: 17/763,540

(22) PCT Filed: Sep. 24, 2020

(86) PCT No.: PCT/JP2020/035916
§ 371 (c)(1),
(2) Date: Mar. 24, 2022

(87) PCT Pub. No.: WO2021/060325
PCT Pub. Date: Apr. 1, 2021

(65) Prior Publication Data
US 2022/0344668 A1    Oct. 27, 2022

(30) Foreign Application Priority Data
Sep. 27, 2019  (JP) .................. 2019-178093

(51) Int. Cl.
*H01M 4/66* (2006.01)
*C22C 11/06* (2006.01)
*H01M 10/06* (2006.01)

(52) U.S. Cl.
CPC ............. *H01M 4/662* (2013.01); *C22C 11/06* (2013.01); *H01M 10/06* (2013.01)

(58) Field of Classification Search
CPC ...................................... H01M 4/02
See application file for complete search history.

(56) References Cited

U.S. PATENT DOCUMENTS

| | | | | |
|---|---|---|---|---|
| 5,128,218 | A * | 7/1992 | Tokunaga | H01M 4/685 429/57 |
| 9,203,116 | B2 * | 12/2015 | Lam | H01M 10/4235 |
| 2001/0009743 | A1 * | 7/2001 | Prengaman | H01M 4/685 29/2 |
| 2006/0154148 | A1 * | 7/2006 | Yoshimine | H01M 10/121 429/245 |
| 2007/0160910 | A1 * | 7/2007 | Sugie | H01M 4/16 429/211 |

(Continued)

FOREIGN PATENT DOCUMENTS

| | | | |
|---|---|---|---|
| EP | 0994518 A1 | | 4/2000 |
| EP | 3306715 | * | 4/2018 |

(Continued)

OTHER PUBLICATIONS

International Search Report (ISR) dated Dec. 1, 2020 filed in PCT/JP2020/035916.

*Primary Examiner* — Scott J. Chmielecki
(74) *Attorney, Agent, or Firm* — RANKIN, HILL & CLARK LLP

(57) ABSTRACT

A lead-acid battery includes a positive electrode plate, a negative electrode plate, and an electrolyte solution. The positive electrode plate includes a positive current collector and a positive electrode material. The negative electrode plate includes a negative current collector and a negative electrode material. The positive current collector contains a lead alloy containing Ca and Sn. The content of Ca in the positive current collector is 0.2% by mass or less, and the content of Sn is 0.5% by mass or more. The negative electrode material contains a first organic expander (excluding a lignin compound) containing at least one selected from the group consisting of a unit of a monocyclic aromatic compound and a unit of a bisphenol S compound.

23 Claims, 1 Drawing Sheet

(56) References Cited

U.S. PATENT DOCUMENTS

| | | | | |
|---|---|---|---|---|
| 2007/0172727 | A1* | 7/2007 | Sugie | H01M 50/44 429/247 |
| 2008/0107960 | A1 | 5/2008 | Furukawa et al. | |
| 2009/0253041 | A1* | 10/2009 | Beckley | B22D 21/007 429/226 |
| 2010/0175934 | A1* | 7/2010 | Lam | H01M 4/621 180/65.21 |
| 2016/0254570 | A1* | 9/2016 | Matsumura | H01M 10/121 429/163 |
| 2018/0006334 | A1* | 1/2018 | Murata | H01M 4/73 |
| 2019/0058180 | A1* | 2/2019 | Kojima | H01M 10/06 |
| 2020/0266495 | A1* | 8/2020 | Takezawa | H01M 50/541 |

FOREIGN PATENT DOCUMENTS

| | | | |
|---|---|---|---|
| JP | H10-302783 | A | 11/1998 |
| JP | H11-40186 | A | 2/1999 |
| JP | 2000-021413 | A | 1/2000 |
| JP | 2000-173575 | A | 6/2000 |
| JP | 2002-134114 | A | 5/2002 |
| JP | 2003-338273 | A | 11/2003 |
| JP | 2004-071477 | A | 3/2004 |
| JP | 2004-281197 | A | 10/2004 |
| JP | 2013-161606 | A | 8/2013 |
| JP | 2017-079166 | A | 4/2017 |
| JP | 2017-155111 | * | 9/2017 |
| JP | 2017-155111 | A | 9/2017 |
| JP | 2018-018742 | A | 2/2018 |
| WO | 2007/036979 | A1 | 4/2007 |
| WO | 2013/122132 | A1 | 8/2013 |
| WO | 2013/150754 | A1 | 10/2013 |
| WO | 2015/056417 | A1 | 4/2015 |
| WO | WO 2015-145800 | * | 10/2015 |
| WO | 2016/088836 | A1 | 6/2016 |
| WO | 2016/110907 | A1 | 7/2016 |
| WO | 2017/110594 | A1 | 6/2017 |
| WO | WO 2018-199123 | * | 12/2019 |

* cited by examiner

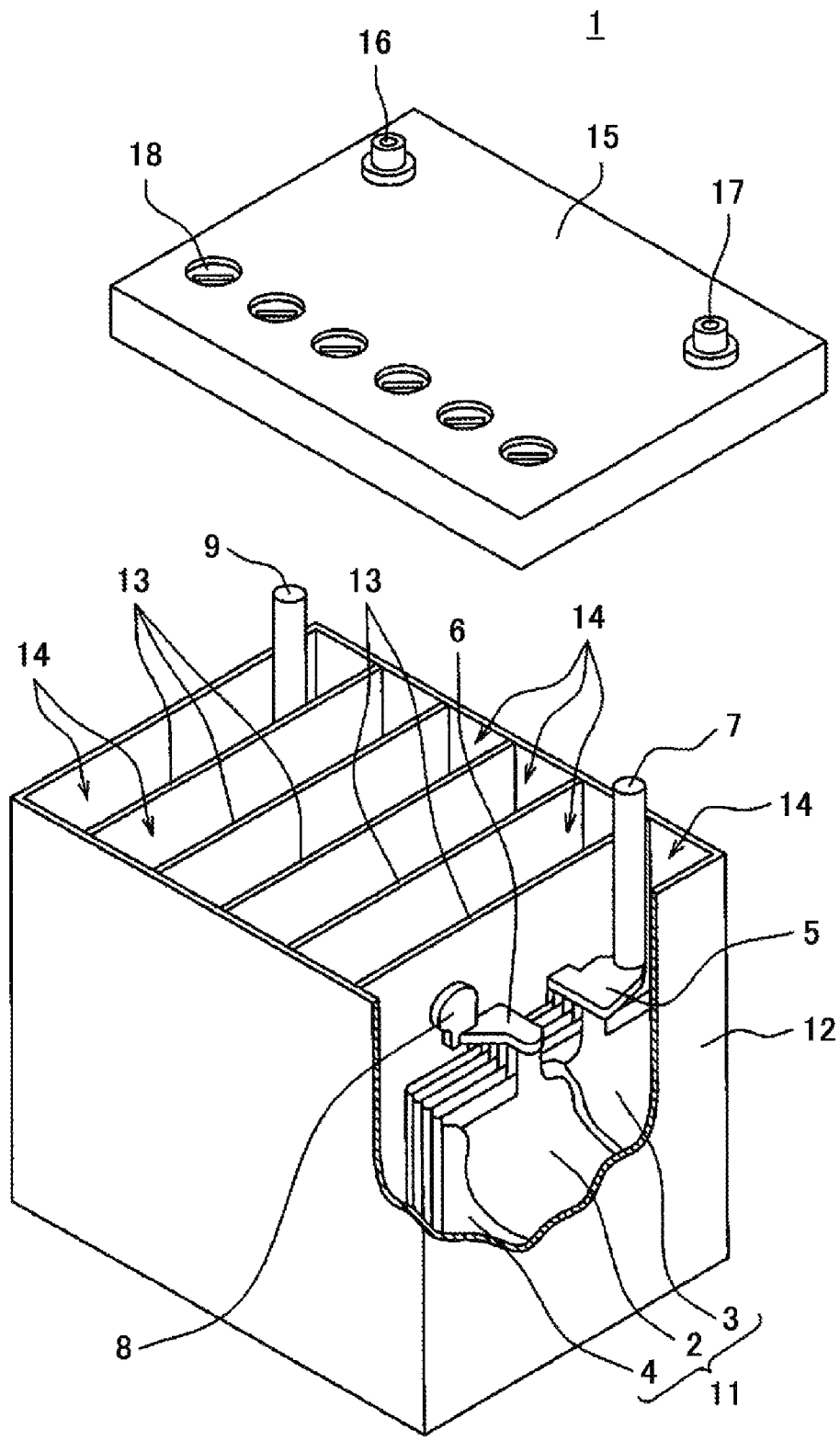

LEAD-ACID BATTERY

TECHNICAL FIELD

The present invention relates to a lead-acid battery.

BACKGROUND ART

Lead-acid batteries are in use for various applications, including automotive and industrial applications. A lead-acid battery includes a negative electrode plate, a positive electrode plate, and an electrolyte solution. The negative electrode plate includes a current collector and a negative electrode material. An organic expander is added to the negative electrode material. As the organic expander, in addition to a naturally occurring organic expander such as sodium ligninsulfonate, a synthetic organic expander is also used. Examples of the synthetic organic expander include condensates of bisphenols.

Patent Document 1 describes a lead-acid battery including a positive electrode, a negative electrode, and an electrolyte solution, in which the negative electrode has a negative electrode material and a negative current collector, the negative electrode material contains a bisphenol resin and a negative active material, the negative current collector has a lug part, and a surface layer of Sn or a Sn alloy is formed on the lug part.

Patent Document 2 describes a flooded-type lead-acid battery including a negative active material containing spongy lead as a main component, a positive active material containing lead dioxide as a main component, and an electrolyte solution containing sulfuric acid and being freely flowable, wherein the negative active material contains carbon, at least one substance selected from the group consisting of cellulose ether, a polycarboxylic acid, and salts thereof, and a water-soluble polymer composed of a bisphenol condensate having a sulfonic acid group, and the positive active material contains antimony.

Patent Document 3 describes a flooded-type lead-acid battery including a negative active material containing spongy lead as a main component, a positive active material containing lead dioxide as a main component, and an electrolyte solution containing sulfuric acid and being freely flowable, wherein the negative active material contains 0.5% by mass or more and 2.5% by mass or less of carbon black, per 100% by mass of the spongy lead in a formed state, a water-soluble polymer composed of a bisphenol condensate having a sulfonic acid group as a substituent, and at least one polycarboxylic acid compound selected from the group consisting of a polyacrylic acid, a polymethacrylic acid, and a polymaleic acid and salts thereof, and the electrolyte solution has a carbon black concentration of 3 mass ppm or less in the formed state.

Patent Document 4 describes a valve regulated lead-acid battery including a positive electrode plate, a negative electrode plate, and an electrolyte solution, wherein the negative electrode plate has a negative current collector and a negative electrode material, the density of the negative electrode material is more than 2.6 g/cm$^3$, the negative electrode material contains an organic expander, and the content of sulfur element in the organic expander is more than 600 µmol/g.

PRIOR ART DOCUMENTS

Patent Documents

Patent Document 1: JP-A-2017-79166
Patent Document 2: WO 2013/150754 A
Patent Document 3: JP-A-2013-161606
Patent Document 4: JP-A-2018-18742

SUMMARY OF THE INVENTION

Problems to be Solved by the Invention

When the charge-discharge cycle is performed, the organic expander is gradually eluted from a negative electrode material, the specific surface area of the negative electrode material decreases, and the low-temperature high-rate (HR) discharge performance decreases. In addition, when the corrosion of the positive current collector progresses due to the charge-discharge cycle and the reaction area of the positive electrode plate decreases, the reaction area of the negative electrode plate facing it decreases, and thus the low-temperature HR discharge performance also decreases. Such a decrease in low-temperature HR discharge performance is particularly remarkable after a charge-discharge cycle in a high-temperature environment.

Means for Solving the Problems

One aspect of the present invention relates to a lead-acid battery including a positive electrode plate, a negative electrode plate, and an electrolyte solution,
wherein the positive electrode plate includes a positive current collector and a positive electrode material,
the negative electrode plate includes a negative current collector and a negative electrode material,
the positive current collector contains a lead alloy containing Ca and Sn,
a content of Ca in the positive current collector is 0.2% by mass or less, and a content of Sn is 0.5% by mass or more, and
the negative electrode material contains a first organic expander (excluding a lignin compound) containing at least one selected from the group consisting of a unit of a monocyclic aromatic compound and a unit of a bisphenol S compound.

Advantages of the Invention

It is possible to suppress a decrease of low-temperature HR discharge performance of the lead-acid battery after a charge-discharge cycle.

BRIEF DESCRIPTION OF THE DRAWINGS

FIG. 1 is a partially cutaway exploded perspective view showing an appearance and an internal structure of a lead-acid battery according to one aspect of the present invention.

MODE FOR CARRYING OUT THE INVENTION

A lead-acid battery according to one aspect of the present invention includes a positive electrode plate, a negative electrode plate, and an electrolyte solution. The positive electrode plate includes a positive current collector and a positive electrode material. The negative electrode plate contains a negative current collector and a negative electrode material. The positive current collector contains a lead alloy containing Ca and Sn. The content of Ca in the positive current collector is 0.2% by mass or less, and the content of Sn is 0.5% by mass or more. The negative electrode material contains a first organic expander (excluding a lignin compound) containing at least one selected from the group consisting of a unit of a monocyclic aromatic compound and a unit of a bisphenol S compound.

The first organic expander is an organic expander having at least one selected from the group consisting of a unit of a monocyclic aromatic compound and a unit of a bisphenol S compound, and other than the lignin compound. The first organic expander is a synthetic organic expander. The synthetic organic expander used in a lead-acid battery is usually an organic condensate (Hereinafter, it is simply referred to as a condensate). The condensate is a compound that can be obtained using a condensation reaction. Since the lignin compound is a natural material, it is excluded from the condensate (synthetic organic expander) which is a synthetic.

In general, when charge-discharge of the lead-acid battery are repeated, the organic expander gradually elutes from the negative electrode material, the specific surface area of the negative electrode material decreases, and the low-temperature HR discharge performance decreases. In addition, when charge-discharge of the lead-acid battery are repeated, corrosion of the positive current collector progresses, and the reaction area in the positive electrode plate decreases. When the reaction area of the positive electrode plate decreases, the reaction area of the negative electrode plates facing it also decreases, and this also decreases the low-temperature HR discharge performance. In particular, in a charge-discharge cycle under a high-temperature environment, such a decrease in low-temperature HR discharge performance becomes remarkable.

Unlike a naturally occurring lignin compound and a condensate of a bisphenol A compound, the first organic expander is likely to form a part having a planar structure in the molecule. Therefore, the first organic expander has high adsorptivity to lead and lead sulfate contained in the negative electrode material. Therefore, even when charge-discharge are performed in a high-temperature environment, elution of the organic expander is suppressed, so that a decrease in the specific surface area of the negative electrode material is suppressed. On the other hand, the lignin compound has a complicated three-dimensional network structure. In addition, the condensate of the bisphenol A compound has a structure in which a methylene group connecting two benzene rings of the bisphenol A compound protrudes from the surface of the benzene ring. Therefore, the lignin compound and the condensate of the bisphenol A compound is inferior in adsorptivity to lead and lead sulfate contained in the negative electrode material as compared with the first organic expander.

In addition, when the first organic expander is used, the overvoltage of the negative electrode plate during charge decreases as compared with the case of the lignin compound and the condensate of the bisphenol A compound, whereby the overvoltage of the positive electrode plate during constant voltage charge is increased. When the overvoltage of the positive electrode plate increases, corrosion of the positive current collector easily proceeds, and an effective reaction area of the positive electrode plate decreases. When the effective reaction area of the positive electrode plate decreases, the effective reaction area of the negative electrode plate facing it also decreases. Therefore, it is difficult to sufficiently exert the effect of suppressing the decrease in the specific surface area of the negative electrode material by the first organic expander.

In the lead-acid battery according to one aspect of the present invention, the contents of Ca and Sn in the positive current collector are controlled, and the first organic expander is used for the negative electrode material. By controlling the contents of Ca and Sn in the positive current collector, corrosion of the positive current collector is suppressed, and a decrease in effective reaction areas of the positive electrode plate and the negative electrode plate is suppressed. Therefore, the effect of suppressing the decrease in the specific surface area of the negative electrode material by the first organic expander is sufficiently exhibited. As a result, it is possible to effectively suppress a decrease of low-temperature HR discharge performance after a charge-discharge cycles.

In the present specification, the low-temperature HR discharge performance of a lead-acid battery after a charge-discharge cycle means low-temperature HR discharge performance after a lead-acid battery in a fully charged state is repeatedly charged and discharged under predetermined conditions. More specifically, a lead-acid battery in a fully charged state is disposed in a water tank at 60° C.±0.5° C., discharged at 25 A for 4 minutes, and then charged at 2.47 V/cell for 10 minutes with an upper limit of current at 25 A. This discharge and charge cycle is defined as 1 cycle, and after 960 cycles are repeated, the low-temperature HR discharge performance is measured.

In the present specification, the fully charged state of the flooded-type lead-acid battery is defined by the definition of JIS D 5301: 2006. More specifically, the following state is defined as a fully charged state: the lead-acid battery is charged in a water bath at 25° C.±2° C. at a current (A) 0.2 times as large as a numerical value described as a rated capacity (Ah) until a terminal voltage during charge measured every 15 minutes or an electrolyte solution density subjected to temperature correction to 20° C. exhibits a constant value at three significant digits continuously three times. In the case of a valve regulated lead-acid battery, the fully charged state is a state where the lead-acid battery is subjected to constant current constant voltage charge of 2.23 V/cell at a current (A) 0.2 times as large as the numerical value described as the rated capacity (Ah) in an air tank of 25° C.±2° C., and the charge is completed when the charge current (A) during constant voltage charge becomes 0.005 times as large as the numerical value described as the rated capacity. Note that the numerical value described as the rated capacity is a numerical value in which the unit is Ah. The unit of the current set based on the numerical value indicated as the rated capacity is A.

The lead-acid battery in a fully charged state means a lead-acid battery fully charged with an already formed lead-acid battery. The full charge of the lead-acid battery may be performed immediately after formation or after a lapse of time from formation as long as it is after formation. For example, after formation, the lead-acid battery in use (preferably in the initial stage of use) may be fully charged. The battery at the initial stage of use means to a battery that has not been used for a long time and has hardly deteriorated.

Herein, a lignin compound includes lignin and a lignin derivative. Lignin derivatives include compounds having a lignin-like three-dimensional structure. Examples of the lignin derivative include at least one selected from the group consisting of modified lignin, lignin sulfonic acid, modified lignin sulfonic acid, and salts thereof (alkali metal salt (sodium salts, etc.), magnesium salt, calcium salt, etc.).

The lead-acid battery may be either a valve regulated (sealed) lead-acid battery or a flooded-type (vented type) lead-acid battery.

Hereinafter, the lead-acid battery and the negative electrode plate according to an embodiment of the present invention is described for each of the main constituent elements, but the present invention is not limited to the following embodiment.

[Lead-Acid Battery]

(Negative Electrode Plate)

The negative electrode plate includes a negative current collector and a negative electrode material. The negative electrode material is a part of the negative electrode plate excluding the negative current collector from the negative electrode plate. Note that a member such as a mat or a pasting paper may be stuck to the negative electrode plate. Such a member (sticking member) is used integrally with the negative electrode plate and is thus included in the negative electrode plate. Also, when the negative electrode plate includes the sticking member, the negative electrode material excludes the negative current collector and the sticking member. However, when the sticking member (a mat, a pasting paper, etc.) is attached to a separator, a thickness of the sticking member is included in a thickness of the separator.

The negative current collector may be formed by casting lead (Pb) or a lead alloy, or may be formed by processing a lead sheet or a lead alloy sheet. Examples of the processing method include expanding processing or punching processing. It is preferable to use a grid-like current collector as the negative current collector because the negative electrode material is easily supported.

The lead alloy used for the negative current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative current collector may include a surface layer. The surface layer and the inner layer of the negative current collector may have different compositions. The surface layer may be formed in a part of the negative current collector. The surface layer may be formed in the lug part of the negative current collector. The surface layer of the lug part may contain Sn or a Sn alloy.

The negative electrode material contains a first organic expander. The negative electrode material usually further contains a negative active material (lead or lead sulfate) that exhibits a capacity through a redox reaction. The negative electrode material may contain at least one selected from the group consisting of another organic expander (Hereinafter, the organic expander may be referred to as a second organic expander), a carbonaceous material, and another additive. Examples of the additive include barium sulfate, fibers (resin fibers and the like), and the like, but are not limited thereto. Note that the negative active material in the charged state is spongy lead, and the non-formed negative electrode plate is usually prepared using a lead powder.

(Organic Expander) The negative electrode material contains an organic expander. The organic expander refers to an organic compound among compounds having a function of suppressing shrinkage of lead as a negative active material when charge-discharge of the lead-acid battery are repeated. As described above, the negative electrode material contains the first organic expander as an essential component among the organic expanders, and may further contain the second organic expander as necessary. The second organic expander is an organic expander other than the first organic expander. As the organic expander, for example, an organic expander synthesized by a known method may be used, or a commercially available product may be used.

Examples of each organic expander include an organic condensate (Hereinafter, it is simply referred to as a condensate). The condensate is a synthetic product, and is also generally referred to as a synthetic organic expander. The condensate may include a unit of an aromatic compound (Hereinafter, it is also referred to as an aromatic compound unit). Note that the unit of an aromatic compound refers to a unit derived from an aromatic compound incorporated in a condensate. That is, the aromatic compound unit is a residue of an aromatic compound. The condensate may contain one kind or two or more kinds of aromatic compound units.

The organic expander also includes the above-described lignin compound.

Examples of the condensate include a condensate of an aromatic compound with an aldehyde compound. Such a condensate can be synthesized by reacting an aromatic compound with an aldehyde compound. Here, a condensate containing a sulfur element can be obtained by performing a reaction between an aromatic compound and an aldehyde compound in the presence of a sulfite or using an aromatic compound containing a sulfur element as an aromatic compound (for example, bisphenol 5). For example, the sulfur element content in the condensate can be adjusted by adjusting at least one of the amount of the sulfite and the amount of the aromatic compound containing sulfur element. The method may be applied to the case of using other raw materials. The aromatic compound to be condensed for obtaining the condensate may be one kind or two or more kinds. The aldehyde compound may be an aldehyde (for example, formaldehyde), or a condensate (or a polymer) of an aldehyde. Examples of the aldehyde condensate (or polymer) include paraformaldehyde, trioxane, and tetraoxymethylene. The aldehyde compound may be used singly or in combination of two or more kinds thereof. Formaldehyde is preferable from the viewpoint of high reactivity with an aromatic compound.

The aromatic compound may have a sulfur-containing group. That is, the condensate may be an organic polymer containing a plurality of aromatic rings and a sulfur element as a sulfur-containing group in the molecule. The sulfur-containing group may be directly bonded to the aromatic ring of the aromatic compound, and for example, may be bonded to the aromatic ring as an alkyl chain having a sulfur-containing group. Among the sulfur-containing groups, a sulfonic acid group or a sulfonyl group which is in a stable form is preferable. The sulfonic acid group may exist in an acid form, or may exist in a salt form like a Na salt.

The sulfur-containing group is a functional group having strong negative polarity. Since such a functional group forms a stable bond with a water molecule, a hydrogen ion, and a hydrogensulfate ion in the electrolyte solution, the functional group tends to be unevenly distributed on the surface of the condensate. Since such a functional group unevenly distributed on the surface has a negative charge, electrostatic repulsion occurs between associates of condensates. As a result, association or aggregation of the colloidal particles of the condensate is limited, and the colloidal particle size tends to be small. As a result, it is considered that the pore size of the negative electrode material is small, and the specific resistance of the negative electrode material is likely to decrease. Therefore, when a condensate having a sulfur-containing group is used, a higher anti-shrink effect can be secured, and excellent low-temperature HR discharge performance and charge acceptability are easily obtained.

Examples of the aromatic ring of the aromatic compound include a benzene ring, a naphthalene ring, and the like. When the aromatic compound has a plurality of aromatic rings, the plurality of aromatic rings may be linked by a direct bond or a linking group (for example, an alkylene group (including an alkylidene group), a sulfone group), or the like. Examples of such a structure include bisarene structures (biphenyl, bisphenylalkane, bisphenylsulfone, and the like).

Examples of the aromatic compound include a compound having the aromatic ring and a functional group (hydroxy group, amino group, and the like). The functional group may be directly bonded to the aromatic ring, or may be bonded as an alkyl chain having a functional group. Note that the hydroxy group also includes salts of hydroxy group (—OMe). The amino group also includes salts of amino group (salts with anion). Examples of Me include alkali metals (Li, K, Na, and the like), Group 2 metals of the periodic table (Ca, Mg, and the like), and the like. The aromatic compound may have a sulfur-containing group and a substituent other than the functional group (for example, an alkyl group or an alkoxy group) in the aromatic ring.

The aromatic compound as the base of the aromatic compound unit may be at least one selected from the group consisting of a bisarene compound and a monocyclic aromatic compound.

Examples of the bisarene compound include a bisarene compound having a hydroxy group (a bisphenol compound, a hydroxybiphenyl compound, and the like) and a bisarene compound having an amino group (a bisarylalkane compound having an amino group, a bisarylsulfone compound having an amino group, a biphenyl compound having an amino group, and the like). Among them, the bisarene compound having a hydroxy group (in particular, a bisphenol compound) is preferable.

As the bisphenol compound, bisphenol A, bisphenol S, bisphenol F, and the like are preferable. For example, the bisphenol compound may contain at least one selected from the group consisting of bisphenol A and bisphenol S. By using bisphenol A or bisphenol S, it is easy to obtain a higher anti-shrink effect on the negative electrode material.

The bisphenol compound may have a bisphenol skeleton, and the bisphenol skeleton may have a substituent. That is, bisphenol A may have a bisphenol A skeleton, and the skeleton may have a substituent. Bisphenol S may have a bisphenol S skeleton, and the skeleton may have a substituent.

As the monocyclic aromatic compound, a hydroxymonoarene compound, a monocyclic aromatic compound having an amino group (aminomonoarene compound), and the like are preferable. Among them, a hydroxymonoarene compound is preferable.

Examples of the hydroxymonoarene compound include a hydroxynaphthalene compound and a phenol compound. For example, it is preferable to use a phenolsulfonic acid compound which is a phenol compound (phenol sulfonic acid or a substitution product thereof). As described above, the phenolic hydroxy group also includes a salt of the phenolic hydroxy group (—OMe).

Examples of the aminomonoarene compound include an aminonaphthalene compound and an aniline compound (aminobenzenesulfonic acid, alkylaminobenzenesulfonic acid, etc.).

The sulfur element content of the organic expander other than the lignin compound may be, for example, 2000 μmol/g or more, or 3000 μmol/g or more. When an organic expander having such a sulfur element content is used, the colloidal particle size of the organic expander tends to be small, and high low-temperature HR discharge performance after a cycle is easily secured.

The sulfur element content in the organic expander being X μmol/g means that the content of the sulfur element contained per 1 g of the organic expander is X μmol.

The upper limit of the sulfur element content of the organic expander other than the lignin compound is not particularly limited, but may be, for example, 9000 μmol/g or less, 8000 μmol/g or less, or 7000 μmol/g or less.

The organic expander other than the lignin compound also includes an organic expander having a sulfur element content of less than 2000 μmol/g. The sulfur element content of such an organic condensing agent may be 300 μmol/g or more.

The sulfur element content of the organic expander other than the lignin compound may be, for example, 2000 μmol/g or more (or 3000 μmol/g or more) and 9000 μmol/g or less, 2000 μmol/g or more (or 3000 μmol/g or more) and 8000 μmol/g or less, 2000 μmol/g or more (or 3000 μmol/g or more) and 7000 μmol/g or less, 300 μmol/g or more and 9000 μmol/g or less (or 8000 μmol/g or less), or 300 μmol/g or more and 7000 μmol/g or less (or less than 2000 μmol/g).

The weight average molecular weight (Mw) of the organic expander other than the lignin compound is preferably, for example, 7000 or more. The Mw of the organic expander is, for example, 100,000 or less, and may be 20,000 or less.

The sulfur element content of the lignin compound is, for example, less than 2000 μmol/g, and may be 1000 μmol/g or less or 800 μmol/g or less. The lower limit of the sulfur element content of the lignin compound is not particularly limited, but is, for example, 400 μmol/g or more.

The Mw of the lignin compound is, for example, less than 7000. The Mw of the lignin compound is, for example, 3000 or more.

In the present specification, the Mw of the organic expander is determined by Gel Permeation Chromatography (GPC). A standard substance used for determining the Mw is sodium polystyrene sulfonate.

The Mw is measured under the following conditions using the following apparatus.

GPC apparatus: Build-up GPC system SD-8022/DP-8020/AS-8020/C0-8020/UV-8020 (manufactured by Tosoh Corporation)

Column: TSKgel G4000SWXL, G2000SWXL (7.8 mm I.D.×30 cm) (manufactured by Tosoh Corporation)

Detector: UV detector, λ=210 nm

Eluent: Mixed solution of NaCl aqueous solution having a concentration of 1 mol/L: acetonitrile (volume ratio=7:3)

Flow rate: 1 mL/min.

Concentration: 10 mg/mL

Injection amount: 10 μL

Standard substance: Na polystyrene sulfonate (Mw=275,000, 35,000, 12,500, 7,500, 5,200, 1,680)

Among the organic expanders, the first organic expander is an organic expander (for example, a condensate) containing at least one selected from the group consisting of a unit of a monocyclic aromatic compound and a unit of a bisphenol S compound among a unit of an aromatic compound. Among the monocyclic aromatic compounds, a monocyclic compounds having a hydroxy group (in particular, a phenolic hydroxy group) (a hydroxymonoarene compound and the like) are preferable. In a condensate of the monocyclic compound having a phenolic hydroxy group with an aldehyde compound, the monocyclic aromatic compound is mainly condensed with the phenolic hydroxy group at least one of an ortho position and a para position (particularly at an ortho position). On the other hand, a condensate of a monocyclic compound having an amino group with an aldehyde compound is condensed via an amino group. Therefore, in the case of using a monocyclic compound having a phenolic hydroxy group, as compared with the case of using a monocyclic compound having an amino group, the twist between aromatic rings in the organic expander molecule is small, and it is easier to have a planar structure, so that it is considered that it is be easier to act on lead and lead sulfate. In the phenolic hydroxy group, the first organic expander is more likely to be negatively charged than in the case of an amino group or the like, so that high adsorptivity to lead is more likely to be obtained.

Among the units of the monocyclic aromatic compound, it is preferable to use a first organic expander containing a unit of a phenolsulfonic acid compound. Such a first organic expander has a phenolic hydroxy group and a sulfonic acid group. Both the phenolic hydroxy group and the sulfonic acid group have strong negative polarity, and have high affinity with metal. In addition, the phenolsulfonic acid makes it easy for the condensate to have a planar structure. Therefore, the condensate containing the unit of a phenolsulfonic acid compound has higher adsorptivity to lead and lead sulfate. Therefore, when such a condensate is used, the elution of the condensate from the negative electrode material can be more effectively suppressed.

The first organic expander may contain the unit of a monocyclic aromatic compound (hereinafter, may be referred to as a first unit) and a unit of another aromatic compound (hereinafter, may be referred to as a second unit). Examples of the second unit include a unit of a bisarene compound. Examples of the second unit include at least one selected from the group consisting of the unit of a bisphenol S compound and a unit of a bisphenol A compound. In an organic expander containing the second unit, in general, an aromatic ring tends to interact between π electrons, and the organic expander tends to be rigid. However, in the first organic expander, the π-electron interaction of the second unit is inhibited by the first unit, so that the flexibility of the molecule can be enhanced. In addition, the organic expander usually contains many functional groups having a negative polarity. It is considered that in the first organic expander, the flexibility of the molecule is enhanced, so that the functional group having negative polarity contained in the first organic expander is likely to be unevenly distributed on the molecular surface. This further suppresses elution of the first organic expander from the negative electrode material, so that it is possible to further suppress decrease of low-temperature HR discharge performance after a charge-discharge cycle.

When the first organic expander contains the first unit and the second unit, the molar rate of the first unit to the total amount of these units is, for example, 10 mol % or more, may be 20 mol % or more, may be 40 mol % or more, or may be 50 mol % or more. When the molar rate is in such a range, the first expander more easily has a planar structure. Therefore, since elution from the negative electrode material is reduced, high low-temperature HR discharge performance after a charge-discharge cycle is obtained. The molar rate of the first unit is, for example, 90 mol % or less, and may be 80 mol % or less. When the molar rate of the first unit is in such a range, the condensate is more likely to be negatively charged. Therefore, since elution from the negative electrode material is reduced, high low-temperature HR discharge performance after a charge-discharge cycle can be secured.

The molar rate of the first unit may be 10 mol % or more (or 20 mol % or more) and 90 mol % or less, 10 mol % or more (or 20 mol % or more) and 80 mol % or less, 40 mol % or more (or 50 mol % or more) and 90 mol % or less, or 40 mol % or more (or 50 mol % or more) and 80 mol % or less.

The second unit is preferably at least the unit of a bisphenol S compound. The first organic expander may contain, as the second unit, the unit of a bisphenol S compound and the unit of a bisphenol A compound. The bisphenol S skeleton has a structure in which two benzene rings are linked by a sulfonyl group. The bisphenol A skeleton has a structure in which two benzene rings are linked by a dimethylene group. The sulfonyl group has smaller protrusion from the benzene ring plane than the dimethylene group. Therefore, as compared with the case of the unit of a bisphenol A compound, the unit of a bisphenol S compound makes it easier for the first organic expander to have a planar structure. In addition, due to the presence of the sulfonyl group, the first organic expander is more likely to be negatively charged in the unit of a bisphenol S compound than in the unit of a bisphenol A compound. Therefore, when the first organic expander having at least the unit of a bisphenol S compound is used as the second unit, the adsorptivity of the first organic expander to lead is further enhanced.

As the first organic expander, an organic expander (condensate) containing at least the unit of a bisphenol S compound may be used. As described above, in the bisphenol S compound, the first organic expander is easily negatively charged due to the presence of the sulfonyl group. Therefore, when the first organic expander having at least the unit of a bisphenol S compound is used, the adsorptivity of the first organic expander to lead can be further enhanced. As the first organic expander, one (condensate) containing the unit of a bisphenol S compound and the unit of a bisphenol A compound may be used. The first organic expander having these units has a smaller colloidal particle size than the condensate of bisphenol S only, and a higher anti-shrink effect can be obtained.

When the first organic expander contains the unit of a bisphenol S compound and the unit of a bisphenol A compound, the molar rate of the unit of a bisphenol S compound to the total amount of these units is, for example, 10 mol or more, and may be 20 mol % or more. The molar rate of the unit of a bisphenol S compound is preferably 40 mol % or more and may be 50 mol % or more from the viewpoint of easily securing high adsorptivity by the bisphenol S compound. The molar rate of the unit of a bisphenol S compound is, for example, 90 mol % or less, and may be 80 mol % or less from the viewpoint of more easily producing fine colloidal particles.

When the first organic expander contains the unit of a bisphenol S compound and the unit of a bisphenol A compound, the molar rate of the unit of a bisphenol S compound to the total amount of these units may be 10 mol % or more (or 20 mol % or more) and 90 mol % or less, 40 mol % or more (or 50 mol % or more) and 90 mol % or less, 10 mol % or more (or 20 mol % or more) and 80 mol % or less, or 40 mol % or more (or 50 mol % or more) and 80 mol % or less.

The sulfur element content and the Mw of the first organic expander can be each selected from the above ranges.

The first organic expander may be used singly or in combination of two or more kinds thereof.

Among the above organic expanders, examples of the second organic expander include the lignin compound and a condensate of a bisphenol A compound with an aldehyde compound.

The second organic expander may be used singly or in combination of two or more kinds thereof.

The sulfur element content of the lignin compound is, for example, less than 2000 µmol/g, and may be 1000 µmol/g or less or 800 µmol/g or less. The lower limit of the sulfur element content of the lignin compound is not particularly limited, but is, for example, 400 µmol/g or more.

The Mw of the lignin compound is, for example, less than 7000. The Mw of the lignin compound is, for example, 3000 or more.

When the first organic expander and the second organic expander are used in combination, the mass ratio of the first organic expander and the second organic expander can be arbitrarily selected. Even when the second organic expander is used in combination, it is possible to obtain the effect of suppressing the decrease of the low-temperature HR discharge performance after a charge-discharge cycle according to the mass ratio of the first organic expander. From the viewpoint of securing higher low-temperature HR discharge performance after a charge-discharge cycle, the rate of the first organic expander in all the organic expander (that is, the total amount of the first organic expander and the second organic expander) is preferably 50% by mass or more, and may be 80% by mass or more, 90% by mass or more, or 95% by mass or more.

The content of the organic expander contained in the negative electrode material is, for example, 0.01% by mass or more and may be 0.05% by mass or more. The content of the organic expander is, for example, 1.0% by mass or less and may be 0.5% by mass or less.

The content of the organic expander contained in the negative electrode material may be 0.01% by mass or more and 1.0% by mass or less, 0.05% by mass or more and 1.0% by mass or less, 0.01% by mass or more and 0.5% by mass or less, or 0.05% by mass or more and 0.5% by mass or less.

(Barium Sulfate)

The negative electrode material can contain barium sulfate. When the first organic expander is used, the surface of lead is covered with the first organic expander, so that charge acceptability tends to decrease. By using barium sulfate for the negative electrode material, decrease of charge acceptability can be reduced.

The content of barium sulfate in the negative electrode material is, for example, 0.05% by mass or more, and may be 0.1% by mass or more or 0.5% by mass or more. From the viewpoint of securing higher low-temperature HR discharge performance after a charge-discharge cycle, the content of barium sulfate is preferably 0.6% by mass or more, and more preferably 0.8% by mass or more. When the content of barium sulfate is in such a range, barium sulfate acts as a crystalline nucleus during discharge, and a large number of fine lead sulfate that is easy to react is generated. As a result, the discharge reaction becomes more uniform over the entire negative electrode plate, so that shrinkage of the negative electrode material is suppressed and a large specific surface area is maintained. In addition, since a large amount of the first organic expander remains in the negative electrode material after a charge-discharge cycle, the surface of the negative electrode material is stabilized by the first organic expander, and a large specific surface area is maintained. As a result, it is considered that higher low-temperature HR discharge performance after a charge-discharge cycle can be secured.

In addition, when the first organic expander contains the first unit, a crystal of lead sulfate generated during discharge tends to be larger than that of the lignin compound or the condensate of bisphenol A, and this tends to slightly decrease charge acceptability. Therefore, when the first organic expander containing the first unit is used, the content of barium sulfate is preferably 0.6% by mass or more, and more preferably 0.8% by mass or more, from the viewpoint of fining lead sulfate to ensure higher charge acceptability.

The content of barium sulfate in the negative electrode material is 5% by mass or less, and may be 3% by mass or less.

The content of barium sulfate in the negative electrode material may be 0.05% by mass or more (or 0.1% by mass or more) and 5% by mass or less, 0.05% by mass or more (or 0.1% by mass or more) and 3% by mass or less, 0.5% by mass or more (or 0.6% by mass or more) and 5% by mass or less, 0.5% by mass or more (or 0.6% by mass or more) and 3% by mass or less, or 0.8% by mass or more and 5% by mass or less (or 3% by mass or less).

(Carbonaceous Material)

The negative electrode material can contain a carbonaceous material. As the carbonaceous material, carbon black, graphite, hard carbon, soft carbon, and the like can be used. Examples of the carbon black include acetylene black, furnace black, and lamp black. Furnace black also includes ketjen black (product name). The graphite may be a carbonaceous material including a graphite-type crystal structure and may be either artificial graphite or natural graphite. One kind of carbonaceous material may be used singly, or two or more kinds thereof may be used in combination.

The content of the carbonaceous material in the negative electrode material is, for example, preferably 0.05% by mass or more and may be 0.10% by mass or more. The content of the carbonaceous material is, for example, 5% by mass or less and may be 3% by mass or less.

The content of the carbonaceous material in the negative electrode material may be, for example, 0.05% by mass or more and 5% by mass or less, 0.05% by mass or more and 3% by mass or less, 0.10% by mass or more and 5% by mass or less, or 0.10% by mass or more and 3% by mass or less.

(Analysis of Constituent Components of Negative Electrode Material)

Hereinafter, a method of analyzing the negative electrode material or constituent components thereof will be described. The analysis of the constituent component of the negative electrode material is performed on the negative electrode plate of the lead-acid battery in a fully charged state. Prior to analysis of the constituent component, a lead-acid battery after formation is fully charged and then disassembled to obtain a negative electrode plate to be analyzed.

The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at 60±5° C. in a reduced pressure environment for about six hours. After drying, when the sticking member is included in the negative electrode plate, the sticking member is removed from the negative electrode plate by peeling. Next, the negative electrode material is separated from the negative electrode plate to obtain a sample (hereinafter referred to as sample A). The sample A is ground as necessary and subjected to analysis.

(1) Analysis of Organic Expander (1-1) Qualitative Analysis of Organic Expander in Negative Electrode Material The pulverized sample A is immersed in a 1 mol/L sodium hydroxide (NaOH) aqueous solution to extract the organic expander. If the extract contains a plurality of organic expanders, then each organic expander is separated from the extract. For each separated material containing each organic expander, insoluble components are removed by filtration, and the obtained solution is desalted, then concentrated, and dried. The desalination is performed by using a desalination column, by causing the solution to pass through an ion-exchange membrane, or by placing the solution in a dialysis tube and immersing the solution in distilled water. The solution is dried to obtain a powder sample (hereinafter, referred to as a sample B) of the organic expander.

A type of the organic expander is specified using a combination of information obtained from an infrared spectroscopic spectrum measured using the sample B of the organic expander obtained as described above, an ultraviolet-visible absorption spectrum measured by an ultraviolet-visible absorption spectrometer after the sample B is diluted with distilled water or the like, or an NMR spectrum of a solution obtained by dissolving the sample B in a predetermined solvent such as heavy water, and the like.

When the extract contains a plurality of organic expanders, the organic expanders are separated as follows.

First, the extract is measured by at least one of infrared spectroscopy, NMR, and GC-MS to determine whether or not a plurality of kinds of organic expanders are contained. Next, a molecular weight distribution is measured by GPC analysis of the extract, and if the plurality of types of organic expanders can be separated by molecular weight, the organic expander is separated by column chromatography based on a difference in molecular weight.

The organic expander has different solubility when at least one of the type of functional group and the amount of functional group is different. When it is difficult to separate the organic expander due to a difference in molecular weight, one of the organic expanders is separated by a precipitation separation method using such a difference in solubility. For example, when two kinds of organic expanders are contained, an aqueous sulfuric acid solution is added dropwise to a mixture obtained by dissolving the extract in a NaOH aqueous solution to adjust the pH of the mixture, thereby aggregating and separating one of the organic expanders. When it is difficult to separate the organic expander by aggregation, the organic expander is separated by ion exchange chromatography or affinity chromatography using a difference in at least one of the type and amount of the functional group. The insoluble component is removed by filtration as described above from the separated material dissolved again in the NaOH aqueous solution. The remaining solution after separating one of the organic expanders is concentrated. The obtained concentrate contains the other organic expander, and the insoluble component is removed from the concentrate by filtration as described above.

(1-2) Quantitative Determination of Content of Organic Expander in Negative Electrode Material Similarly to (1-1) above, for each separated material containing the organic expander, a solution is obtained after removing the insoluble component by filtration. The ultraviolet-visible absorption spectrum of each obtained solution is measured. The content of each organic expander in the negative electrode material is determined using an intensity of a characteristic peak of each organic expander and a calibration curve prepared in advance.

When a lead-acid battery in which the content of the organic expander is unknown is obtained and the content of the organic expander is measured, a structural formula of the organic expander cannot be strictly specified, so that the same organic expander may not be used for the calibration curve. In this case, the content of the organic expander is measured using the ultraviolet-visible absorption spectrum by creating a calibration curve using the organic expander extracted from the negative electrode of the battery and a separately available organic polymer in which the ultraviolet-visible absorption spectrum, the infrared spectroscopic spectrum, the NMR spectrum, and the like exhibit similar shapes.

(1-3) Content of Sulfur Element in Organic Expander

Similarly to (1-1) above, after the sample B of the organic expander is obtained, sulfur element in 0.1 g of the organic expander is converted into sulfuric acid by an oxygen combustion flask method. At this time, the sample B is burned in a flask containing an adsorbent to obtain an eluate in which sulfate ions are dissolved in the adsorbent. Next, the eluate is titrated with barium perchlorate using thorin as an indicator to determine the content (C0) of the sulfur element in 0.1 g of the organic expander. Next, C0 is multiplied by 10 to calculate the content (µmol/g) of the sulfur element in the organic expander per 1 g.

(1-4) Calculation of Molar Ratio of Constituent Units of Organic Expander

First, a sample B of an organic expander (organic expander to be measured) separated in the same manner as in the above (1-1) is dissolved in a deuterated aqueous solution of sodium hydroxide (pH 10 to 13) to prepare a measurement sample, and $^1$H-NMR is measured using the measurement sample. The unit contained in the organic expander is identified from the peak of a $^1$H-NMR spectrum. In this $^1$H-NMR spectrum, a ratio (first ratio) of peak intensity of a peak derived from each unit is determined.

Next, an organic expander (reference organic expander) containing the unit with the same structure as the identified structure and having a known mole fraction of each unit is synthesized. The $^1$H-NMR spectrum of the reference organic expander is measured. In this $^1$H-NMR spectrum, a ratio (second ratio) of peak intensity of a peak derived from each unit is determined.

A lead-acid battery is prepared using a reference organic expander to be in a fully charged state. A sample A is collected from the negative electrode plate taken out from the lead-acid battery in the fully charged state in the same manner as described above. Using this sample A, a sample B is obtained in the same manner as in the above (1-1). The resulting sample B is dissolved in a deuterated aqueous solution of sodium hydroxide (pH 10 to 13) to prepare a measurement sample, and $^1$H-NMR is measured using the measurement sample. In this $^1$H-NMR spectrum, a ratio (third ratio) of peak intensity of a peak derived from each unit is determined.

The third ratio may deviate from the second ratio which is indicative of the actual mole fraction. Therefore, for correction, the relation between the second ratio and the third ratio and the known mole fraction is obtained. This relation indicates the relation between the actual mole fraction of each unit and the peak intensity ratio of the peak of each unit of the organic expander when taken out from the lead-acid battery. By applying the first ratio to this relation, the mole fraction of each unit in the organic expander to be measured can be obtained from the first ratio. Then, the rate (mol %) of the mole fraction of each unit to the total mole fraction of each unit is calculated and taken as the molar rate of each unit.

For example, when the first organic expander is a condensate of phenolsulfonic acid and bisphenol S with formaldehyde, in a $^1$H-NMR spectrum, a peak ($P_{bs}$) derived from a bisphenol S unit is found in a range of 6.5 ppm or more and 6.6 ppm or less, and a peak ($P_{ps}$) derived from a phenolsulfonic acid unit is found in a range of more than 6.6 ppm and 7.0 ppm or less, respectively. From $^1$H-NMR of the first organic expander in which the mole fractions of the bisphenol S unit and the phenolsulfonic acid unit are known, the ratio (second ratio and third ratio) of the peak intensity $I_{bs}$ of the peak $P_{bs}$ to the peak intensity $I_{ps}$ of the peak $P_{ps}$ is determined. The relation between the second and third ratios and the known mole fraction is then determined. A ratio (first ratio) of the peak intensity $I_{bs}$ of the peak $P_{bs}$ to the peak intensity $I_{ps}$ of the peak $P_{ps}$ in $^1$H-NMR of the first organic expander having an unknown mole fraction is applied to this relation to determine the mole fraction $m_{bs}$ of the bisphenol S unit and the mole fraction $m_{ps}$ of the phenolsulfonic acid unit of the first organic expander. Then, the ratio (mol %) of the mole fraction $m_{ps}$ of the phenolsulfonic acid unit to the sum of the mole fraction $m_{bs}$ and the mole fraction $m_{ps}$ is calculated and taken as the molar rate of the phenolsulfonic acid unit.

(2) Quantitative Determination of Carbonaceous Material and Barium Sulfate

To 10 g of the pulverized sample A, 50 ml of nitric acid having a concentration of 20% by mass is added and heated for about 20 minutes to dissolve the lead component as lead nitrate. Next, a solution containing lead nitrate is filtered, and solids such as carbonaceous materials and barium sulfate are filtered off.

The obtained solid is dispersed in water to form a dispersion, and then components except for the carbonaceous material and barium sulfate (e.g., reinforcing material) are removed from the dispersion by using a sieve. Next, the dispersion is subjected to suction filtration using a membrane filter with its mass measured in advance, and the membrane filter is dried with the filtered sample in a dryer at 110° C.±5° C. The obtained sample is a mixed sample of carbonaceous material and barium sulfate (hereinafter also referred to as sample C). A mass ($M_m$) of the sample C is measured by subtracting the mass of the membrane filter from the total mass of dried sample C and the membrane filter. Thereafter, the dried sample C is placed in a crucible together with a membrane filter and is burned and incinerated at 700° C. or higher. The residue remaining is barium oxide. The mass ($M_B$) of barium sulfate is determined by converting the mass of barium oxide to the mass of barium sulfate. The mass of the carbonaceous material is calculated by subtracting the mass $M_B$ from the mass $M_m$.

(Others)

The negative electrode plate can be formed in such a manner that a negative current collector is coated or filled with a negative electrode paste, which is then cured and dried to prepare a non-formed negative electrode plate, and thereafter, the non-formed negative electrode plate is formed. The negative electrode paste is prepared by adding water and sulfuric acid to lead powder and an organic expander, and various additives as necessary, and kneading the mixture. At the time of curing, it is preferable to cure the non-formed negative electrode plate at a higher temperature than room temperature and high humidity.

The formation can be performed by charging the element in a state where the element including the non-formed negative electrode plate immersed in the electrolyte solution containing sulfuric acid in the container of the lead-acid battery. However, the formation may be performed before the lead-acid battery or the element is assembled. The formation produces spongy lead.

(Positive Electrode Plate)

A positive electrode plate of a lead-acid battery usually contains a positive current collector and a positive electrode material. The positive electrode material is held by the positive current collector. The positive electrode plate of a lead-acid battery can be classified into a paste-type, a clad-type, and the like. Either a paste-type or a clad-type positive electrode plate may be used.

In the paste-type positive electrode plate, the positive electrode material is a part of the positive electrode plate excluding the positive current collector. A member such as a mat or a pasting paper may be stuck to the positive electrode plate. Such a member (sticking member) is used integrally with the positive electrode plate, and is thus included in the positive electrode plate. When the positive electrode plate includes a sticking member (a mat, a pasting paper, etc.), the positive electrode material is a part of the positive electrode plate excluding the positive current collector and the sticking member in the paste-type positive electrode plate.

The positive current collector may be formed by casting a lead alloy, or may be formed by processing a lead sheet or a lead alloy sheet. Examples of the processing method include expanding processing or punching processing. It is preferable to use a grid-like current collector as the positive current collector because the positive electrode material is easily supported.

The positive current collector is made of a lead alloy containing Ca and Sn. By controlling the contents of Ca and Sn in the positive current collector, corrosion of the positive current collector due to a charge-discharge cycle is suppressed, and the effect of the first organic expander is effectively exhibited. Examples of the lead alloy used for the positive current collector include a Pb—Ca—Sn-based alloy.

The content of Ca in the positive current collector is 0.2% by mass or less. When the content of Ca exceeds 0.2% by mass, a large amount of the Ca-rich phase precipitates at the grain boundary of a Pb alloy, so that grain boundary corrosion becomes remarkable, and thus the low-temperature HR discharge performance after a cycle is remarkably decreases. From the viewpoint of securing a higher corrosion suppressing effect of the positive current collector, the content of Ca is preferably 0.14% by mass or less or 0.12% by mass or less. When the content of Ca is in such a range, higher low-temperature HR discharge performance after a charge-discharge cycle can be obtained. The content of Ca is, for example, 0.01% by mass or more, and may be 0.03% by mass or more or 0.04% by mass or more.

The content of Ca in the positive current collector may be 0.01% by mass or more (or 0.03% by mass or more) and 0.2% by mass or less, 0.01% by mass or more (or 0.03% by mass or more) and 0.14% by mass or less, 0.01% by mass or more (or 0.03% by mass or more) and 0.12% by mass or less, 0.04% by mass or more and 0.2% by mass or less (or 0.14% by mass or less), or 0.04% by mass or more and 0.12% by mass or less.

The content of Sn in the positive current collector is 0.5% by mass or more. When the content of Sn is less than 0.5% by mass, grain boundary corrosion easily proceeds, so that the low-temperature HR discharge performance after a cycle is remarkably decreased. From the viewpoint of securing a higher corrosion suppressing effect of the positive current collector, the content of Sn is preferably 0.8% by mass or more or 1.0% by mass or more. The content of Sn is, for example, 5% by mass or less, and may be 3% by mass or less.

The content of Sn in the positive current collector may be 0.5% by mass or more and 5% by mass or less (or 3% by mass or less), 0.8% by mass or more and 5% by mass or less (or 3% by mass or less), or 1.0% by mass or more and 5% by mass or less (or 3% by mass or less).

Quantification of Ca and Sn contained in the positive current collector can be analyzed, for example, in accordance with lead separation inductively coupled plasma atomic emission spectroscopy described in JIS H 2105. When analyzing the content of elements contained in the positive current collector of the positive electrode plate taken out from the lead-acid battery, first, vibration is applied to the positive electrode plate to cause the positive electrode material to fall off from the positive current collector, then the positive electrode material remaining around the positive current collector is removed using a ceramic knife, and a part having metallic luster is collected as a sample. The collected sample is decomposed with tartaric acid and dilute nitric acid to obtain an aqueous solution. Hydrochloric acid is added to the aqueous solution to precipitate lead chloride, and the filtrate was collected by filtration. The Ca concentration and the Sn concentration in the filtrate are analyzed by a calibration curve method using an inductively coupled plasma (ICP) emission spectrometer (for example, ICPS-8000 manufactured by Shimadzu Corporation), and converted into the Ca content and the Sn content per mass of the positive current collector.

The positive current collector may include a surface layer. The surface layer and the inner layer of the positive current collector may have different compositions. The surface layer may be formed in a part of the positive current collector. The surface layer may be formed only on the grid part, only on the lug part, or only on the frame rib part of the positive current collector.

The positive electrode material contained in the positive electrode plate contains a positive active material (lead dioxide or lead sulfate) that exhibits a capacity through a redox reaction. The positive electrode material may optionally contain another additive.

A non-formed paste-type positive electrode plate is obtained by filling a positive current collector with a positive electrode paste, and curing and drying the paste. The positive electrode paste is prepared by kneading lead powder, an additive, water, and sulfuric acid.

The positive electrode plate is obtained by forming the non-formed positive electrode plate. The formation can be performed by charging the element in a state where the element including the non-formed positive electrode plate immersed in the electrolyte solution containing sulfuric acid in the container of the lead-acid battery. However, the formation may be performed before the lead-acid battery or the element is assembled.

(Separator)

The separator can be disposed between the negative electrode plate and the positive electrode plate. As the separator, for example, at least one selected from a nonwoven fabric and a microporous film is used. The thickness of separators interposed between the negative electrode plate and the positive electrode plate may be selected in accordance with the inter-electrode distance. The number of separators may be selected according to the number between the poles.

The nonwoven fabric is a mat in which fibers are intertwined without being woven and is mainly made of fibers. In the nonwoven fabric, for example, 60% by mass or more of the nonwoven fabric is formed of fibers. As the fibers, there can be used glass fibers, polymer fibers (polyolefin fiber, acrylic fiber, polyester fiber (polyethylene terephthalate fiber, etc.), etc.), pulp fibers, and the like. Among them, glass fibers are preferable. The nonwoven fabric may contain components other than the fibers (for example, an acid resistant inorganic powder and a polymer as a binder).

On the other hand, the microporous film is a porous sheet mainly made of components except for fiber components and is obtained by, for example, extrusion molding a composition containing, for example, a pore-forming additive (at least one of a polymer powder and oil) into a sheet shape and then removing the pore-forming additive to form pores. The microporous film is preferably composed of a material having acid resistance, and is preferably composed mainly of a polymer component. As the polymer component, a polyolefin (a polyethylene, a polypropylene, etc.) is preferable.

The separator may be, for example, made of only a nonwoven fabric or made of only a microporous film. The separator may be, when required, a laminate of a nonwoven fabric and a microporous film, a laminate of different or the same kind of materials, or a laminate of different or the same kind of materials in which recesses and projections are engaged to each other.

The separator may have a sheet shape or may be formed in a bag shape. One sheet-like separator may be disposed between the positive electrode plate and the negative electrode plate. Further, the electrode plate may be disposed so as to be sandwiched by one sheet-like separator in a folded state. In this case, the positive electrode plate sandwiched by the folded sheet-like separator and the negative electrode plate sandwiched by the folded sheet-like separator may be overlapped, or one of the positive electrode plate and the negative electrode plate may be sandwiched by the folded sheet-like separator and overlapped with the other electrode plate. Also, the sheet-like separator may be folded into a bellows shape, and the positive electrode plate and the negative electrode plate may be sandwiched by the bellows-shaped separator such that the separator is interposed therebetween. When the separator folded in a bellows shape is used, the separator may be disposed such that the folded part is along the horizontal direction of the lead-acid battery (e.g., such that the bent part may be parallel to the horizontal direction), and the separator may be disposed such that the folded part is along the vertical direction (e.g., such that the bent part is parallel to the vertical direction). In the separator folded in the bellows shape, recesses are alternately formed on both main surface sides of the separator. Since the lug parts are usually formed on each of the upper part of the positive electrode plate and the negative electrode plate, when the separator is disposed such that the folded parts are along the horizontal direction of the lead-acid battery, the positive electrode plate and the negative electrode plate are each disposed only in the recess on one main surface side of the separator (i.e., a double separator is interposed between the adjacent positive and negative plates). When the separator is disposed such that the folded part is along the vertical direction of the lead-acid battery, the positive electrode plate can be housed in the recess on one main surface side, and the negative electrode plate can be housed in the recess on the other main surface side (i.e., the separator can be interposed singly between the adjacent positive and negative plates). When the bag-shaped separator is used, the bag-shaped separator may house the positive electrode plate or may house the negative electrode plate.

In the present specification, in the plate, the up-down direction is defined with a side on which a lug part is provided as an upper side and a side opposite to the lug part as a lower side. The up-down direction of the plate may be the same as or different from the up-down direction of the lead-acid battery in the vertical direction. The lead-acid battery may be placed vertically or horizontally (Electrolyte Solution)

The electrolyte solution is an aqueous solution containing sulfuric acid and may be gelled as necessary. The electrolyte solution may contain at least one selected from the group consisting of a cation (for example, a metal cation) and an anion (for example, an anion other than a sulfate anion (a phosphate ion, etc.)) as necessary. Examples of the metal cation include at least one selected from the group consisting of a sodium ion, a lithium ion, a magnesium ion, and an aluminum ion.

The specific gravity of the electrolyte solution in the lead-acid battery in a fully charged state at 20° C. is, for example, 1.20 or more and may be 1.25 or more. The specific gravity of the electrolyte solution at 20° C. is 1.35 or less and preferably 1.32 or less.

The specific gravity of the electrolyte solution in the lead-acid battery in a fully charged state at 20° C. may be 1.20 or more and 1.35 or less, 1.20 or more and 1.32 or less, 1.25 or more and 1.35 or less, or 1.25 or more and 1.32 or less.

The lead-acid battery can be obtained by a production method including a step of assembling a lead-acid battery by housing a positive electrode plate, a negative electrode plate, and an electrolyte solution in a container. In the assembly process of the lead-acid battery, the separator is usually disposed so as to be interposed between the positive electrode plate and the negative electrode plate. The assembly process of the lead-acid battery may include a step of forming at least one of the positive electrode plate and the negative electrode plate as necessary after the step of housing the positive electrode plate, the negative electrode plate, and the electrolyte solution in the container. The positive electrode plate, the negative electrode plate, the electrolyte solution, and the separator are each prepared before being housed in the container.

FIG. 1 shows an appearance of an example of a lead-acid battery according to an embodiment of the present invention. A lead-acid battery 1 includes a container 12 that houses an element 11 and an electrolyte solution (not shown). The inside of the container 12 is partitioned by partitions 13 into a plurality of cell chambers 14. Each of the cell chambers 14 contains one element 11. An opening of the container 12 is closed with a lid 15 having a negative electrode terminal 16 and a positive electrode terminal 17. The lid 15 is provided with a vent plug 18 for each cell chamber. At the time of water addition, the vent plug 18 is removed to supply a water addition liquid. The vent plug 18 may have a function of discharging gas generated in the cell chamber 14 to the outside of the battery.

The element 11 is configured by laminating a plurality of negative electrode plates 2 and positive electrode plates 3 with a separator 4 interposed therebetween. Here, the bag-shaped separator 4 housing the negative electrode plate 2 is shown, but the form of the separator is not particularly limited. In the cell chamber 14 located at one end part of the container 12, a negative electrode shelf part 6 for connecting the plurality of negative electrode plates 2 in parallel is connected to a penetrating connection body 8, and a positive electrode shelf part 5 for connecting the plurality of positive electrode plates 3 in parallel is connected to a positive pole 7. The positive pole 7 is connected to the positive electrode terminal 17 outside the lid 15. In the cell chamber 14 located at the other end part of the container 12, a negative pole 9 is connected to the negative electrode shelf part 6, and the penetrating connection body 8 is connected to the positive electrode shelf part 5. The negative pole 9 is connected to the negative electrode terminal 16 outside the lid 15. Each of the penetrating connection bodies 8 passes through a through-hole provided in the partition 13 to connect the elements 11 of the adjacent cell chambers 14 in series.

The positive electrode shelf part 5 is formed by welding the lug parts, provided on the upper parts of the respective positive electrode plates 3, to each other by a cast-on-strap method or a burning method. The negative electrode shelf part 6 is also formed by welding the lug parts, provided on the upper parts of the respective negative electrode plates 2, to each other in accordance with the case of the positive electrode shelf part 5.

The lid 15 of the lead-acid battery has a single structure (single lid), but is not limited to the illustrated examples. The lid 15 may have, for example, a double structure including an inner lid and an outer lid (or an upper lid). The lid having the double structure may have a reflux structure between the inner lid and the outer lid for returning the electrolyte solution into the battery (inside the inner lid) through a reflux port provided in the inner lid.

The lead-acid battery according to one aspect of the present invention will be described below.

(1) A lead-acid battery including a positive electrode plate, a negative electrode plate, and an electrolyte solution,
wherein the positive electrode plate includes a positive current collector and a positive electrode material,
the negative electrode plate includes a negative current collector and a negative electrode material,
the positive current collector contains a lead alloy containing Ca and Sn,
a content of Ca in the positive current collector is 0.2% by mass or less, and a content of Sn is 0.5% by mass or more, and
the negative electrode material contains a first organic expander (excluding a lignin compound) containing at least one selected from the group consisting of a unit of a monocyclic aromatic compound and a unit of a bisphenol S compound.

(2) In the (1), the content of Ca in the positive current collector may be 0.14% by mass or less, or 0.12% by mass or less.

(3) In the (1) or (2), the content of Ca in the positive current collector may be 0.01% by mass or more, 0.03% by mass or more, or 0.04% by mass or more.

(4) In any one of the (1) to (3), the content of Sn in the positive current collector may be 0.8% by mass or more, or 1.0% by mass or more.

(5) In any one of the (1) to (4), the content of Sn in the positive current collector may be 5% by mass or less, or 3% by mass or less.

(6) In any one of the (1) to (5), the negative electrode material may further contain barium sulfate.

(7) In the (6), the content of barium sulfate in the negative electrode material may be 0.05% by mass or more, 0.1% by mass or more, 0.5% by mass or more, 0.6% by mass or more, or 0.8% by mass or more.

(8) In the (6) or (7), the content of barium sulfate in the negative electrode material may be 5% by mass or less or 3% by mass or less.

(9) In any one of the (1) to (8), the first organic expander may contain a unit (first unit) of the monocyclic aromatic compound and a unit (second unit) of another aromatic compound.

(10) In the (9), the second unit may include at least a unit of a bisarene compound, and the unit of the bisarene compound may be at least one selected from the group consisting of the unit of a bisphenol S compound and the unit of a bisphenol A compound.

(11) In the (10), the unit of a bisarene compound may include at least the unit of a bisphenol S compound.

(12) In any one of the (1) to (11), the unit of the monocyclic aromatic compound may contain at least a unit of phenolsulfonic acid.

(13) In any one of (11) to (13), the molar rate of the first unit to the total amount of the first unit and the second unit may be 10 mol % or more, 20 mol % or more, 40 mol % or more, or 50 mol % or more.

(14) In any one of (11) to (13), a molar rate of the first unit to the total amount of the first unit and the second unit may be 90 mol % or less, or 80 mol % or less.

(15) In any one of the (1) to (8), the first organic expander may contain the unit of a bisphenol S compound and the unit of a bisphenol A compound.

(16) In the (15), the molar rate of the unit of a bisphenol S compound to the total amount of the unit of a bisphenol S compound and the unit of a bisphenol A compound in the first organic expander may be 40 mol % or more.

(17) In the (15) or (16), the molar rate of the unit of a bisphenol S compound to the total amount of the unit of a bisphenol S compound and the unit of a bisphenol A compound may be 10 mol % or more, 20 mol % or more, 40 mol % or more, or 50 mol % or more.

(18) In any one of the (15) to (17), the molar rate of the unit of a bisphenol S compound to the total amount of the unit of a bisphenol S compound and the unit of a bisphenol A compound may be 90 mol % or less, or 80 mol % or less.

(19) In any one of the (1) to (18), the sulfur element content of the first organic expander may be 300 µmol/g or more, 2000 µmol/g or more, or 3000 µmol/g or more.

(20) In any one of the (1) to (19), the sulfur element content of the first organic expander may be 8000 µmol/g or less, or 7000 µmol/g or less.

(21) In any one of the (1) to (18), the sulfur element content of the first organic expander may be less than 2000 µmol/g.

(22) In the (21), the sulfur element content of the first organic expander may be 300 µmol/g or more.

(23) In any one of the (1) to (22), the weight average molecular weight (Mw) of the organic expander may be 7000 or more.

(24) In any one of the (1) to (23), the weight average molecular weight (Mw) of the organic expander may be 100,000 or less, or 20,000 or less.

(25) In any one of the (1) to (24), the content (a sum of contents of the first organic expander and an organic expander (second organic expander) other than the first organic expander) of the organic expander contained in the negative electrode material may be 0.01% by mass or more and 0.05% by mass or more.

(26) In any one of the (1) to (25), the content (a sum of contents of the first organic expander and an organic expander (second organic expander) other than the first organic expander) of the organic expander contained in the negative electrode material may be 1.0% by mass or less, or 0.5% by mass or less.

(27) In any one of the (1) to (26), the negative electrode material may further contain a carbonaceous material.

(28) In the (27), the content of the carbonaceous material in the negative electrode material may be 0.05% by mass or more or 0.10% by mass or more.

(29) In the (27) or (28), the content of the carbonaceous material in the negative electrode material may be 5% by mass or less or 3% by mass or less.

(30) In any one of the (1) to (29), the specific gravity of the electrolyte solution at 20° C. in the lead-acid battery in a fully charged state may be 1.20 or more or 1.25 or more.

(31) In any one of the (1) to (30), the specific gravity of the electrolyte solution at 20° C. in the lead-acid battery in a fully charged state may be 1.35 or less or 1.32 or less.

Example

Hereinafter, the present invention will be specifically described on the basis of examples and comparative examples, but the present invention is not limited to the following examples.

<<Lead-Acid Batteries A1-1 to A3-12, R1-1 to R3-2, and B1-1 to B2>>

(1) Preparation of Lead-Acid Battery (a) Preparation of Negative Electrode Plate A lead powder, water, dilute sulfuric acid, carbon black, an organic expander, and barium sulfate as necessary are mixed to obtain a negative electrode paste. At this time, the respective components are mixed so that the content of the organic expander in the negative electrode material and the content of carbon black, which are both determined by the procedure described above, are 0.10% by mass and 0.30% by mass, respectively. Barium sulfate is mixed with other components so that the content of barium sulfate determined by the procedure described above is a value shown in Table 1. A mesh part of an expanded grid made of a Pb—Ca—Sn-based alloy as a negative current collector is filled with the negative electrode paste, which is then cured and dried to obtain a non-formed negative electrode plate.

As the organic expander, the condensates shown in Table 1 are used. The condensates shown in Table 1 are as follows. The molar rate of monomers in each organic expander corresponds to the molar rate of units determined by the procedure described above.

a1: Formaldehyde condensate of bisphenol S and phenol-sulfonic acid (=2:8 (molar ratio)) (sulfur element content: 4000 µmol/g, Mw: 8000)

a2: Formaldehyde condensate of bisphenol A and phenol-sulfonic acid (=2:8 (molar ratio)) (sulfur element content: 4000 µmol/g, Mw: 8000)

a3: Condensate obtained by condensing bisphenol S, bisphenol A (=4:6 (molar ratio)), and formaldehyde in the presence of sodium sulfite (sulfur element content: 5000 µmol/g, Mw: 9000)

b1: Sodium ligninsulfonate (sulfur element content: 600 µmol/g, Mw: 5500)

b2: Condensate of bisphenol A and formaldehyde in the presence of sodium sulfite (sulfur element content: 3000 µmol/g, Mw: 9000)

(b) Preparation of Positive Electrode Plate

Lead powder as raw material is mixed with a sulfuric acid aqueous solution to obtain a positive electrode paste. A mesh part of a lead alloy grid as a positive current collector is filled with the positive electrode paste, which is then cured and dried to obtain a non-formed positive electrode plate. As the positive current collector, an expanded grid made of a Pb—Ca—Sn alloy in which the Ca content and the Sn content determined by the above-described procedure are values shown in Table 1 is used.

(c) Preparation of Lead-Acid Battery

The non-formed negative electrode plate is housed in a bag-shaped separator formed of a polyethylene microporous film, and an element is formed of five non-formed negative electrode plates and four non-formed positive electrode plates.

The element is inserted into a container, an electrolyte solution is filled into the container, and formation is performed in the container, thereby preparing flooded-type lead-acid batteries E1 to E3 and R1 to R5 having a rated voltage of a lead-acid battery of 12 V and a rated capacity of 30 Ah (5 hour rate). As the electrolyte solution, a sulfuric acid aqueous solution having a specific gravity of 1.28 (20° C.) after formation is used. The lead-acid battery is fully charged by the formation.

(2) Evaluation (2-1) Initial Performance (a) Low-Temperature HR Discharge Performance The prepared lead-acid battery is discharged at a discharge current of 150 A at −15° C.±0.3° C. until the terminal voltage reaches 1 V/cell, and the discharge time (discharge duration time) (s) at this time is determined. The ratio (%) when the discharge duration time of the lead-acid battery B1-3 is 100 is used as an index of the low-temperature HR discharge performance.

(b) Charge Acceptability

The amount of electricity at 10 seconds is measured using the prepared lead-acid battery. Specifically, the lead-acid battery is discharged at 7.2 A for 30 minutes. Next, the lead-acid battery is charged at a constant current and a constant voltage of 2.4 V/cell with an upper limit of current at 100 A, and an integrated electric quantity for 10 seconds (10 second electric quantity) at this time is measured. Both operations are performed in a water bath at 25° C.±0.3° C.

(2-2) Low-Temperature HR Discharge Performance after Charge-Discharge Cycle

The prepared lead-acid battery is discharged at 25 A for 4 minutes. Next, the lead-acid battery is charged at 2.47 V/cell for 10 minutes with an upper limit of current at 25 A. This cycle of discharge and charge is defined as 1 cycle, and 960 cycles are repeated. Both operations are performed in a water bath at 60° C.±0.5° C.

After the cycle of discharge and charge is repeated, the discharge duration time is determined by the procedure of the (2-1) (a). The ratio (%) when the discharge duration time of the lead-acid battery B1-2 is 100 is used as an index of the low-temperature HR discharge performance.

Table 1 shows the results.

TABLE 1

| Battery | Organic expander | Content of barium sulfate [mass %] | Positive current collector Ca content [mass %] | Positive current collector Sn content [mass %] | Initial performance Low-temperature HR discharge performance [%] | Initial performance Charge acceptability [%] | After charge-discharge cycle Low-temperature HR discharge performance [%] |
|---|---|---|---|---|---|---|---|
| A1-12 | a1 | 0 | 0.075 | 2.0 | 126 | 88 | 116 |
| A1-11 | | 0.6 | | | 135 | 96 | 133 |
| A1-1 | | 0.8 | | | 137 | 102 | 142 |
| A1-2 | | 1.0 | | | 139 | 103 | 146 |
| A1-3 | | 1.5 | | | 141 | 105 | 150 |
| A1-4 | | 3.0 | | | 140 | 106 | 150 |
| A1-5 | | 0.8 | 0.04 | | 136 | 101 | 142 |
| A1-6 | | | 0.12 | | 137 | 102 | 140 |
| A1-7 | | | 0.075 | 1.0 | 137 | 101 | 138 |
| A1-8 | | | | 3.0 | 138 | 102 | 141 |
| A1-9 | | | 0.18 | 2.0 | 138 | 102 | 118 |
| A1-10 | | | 0.075 | 0.5 | 135 | 100 | 122 |
| R1-1 | | | 0.23 | 2.0 | 138 | 102 | 99 |
| R1-2 | | | 0.075 | 0.2 | 134 | 100 | 99 |
| A2-1 | a2 | 0.8 | 0.075 | 2.0 | 112 | 101 | 132 |
| A2-2 | | 3.0 | | | 115 | 105 | 145 |
| A3-12 | a3 | 0 | 0.075 | 2.0 | 103 | 93 | 110 |
| A3-11 | | 0.6 | | | 108 | 101 | 120 |
| A3-1 | | 0.8 | | | 109 | 103 | 125 |
| A3-2 | | 1.0 | | | 110 | 104 | 128 |
| A3-3 | | 1.5 | | | 111 | 105 | 131 |
| A3-4 | | 3.0 | | | 111 | 105 | 130 |
| A3-5 | | 0.8 | 0.04 | | 110 | 100 | 126 |
| A3-6 | | | 0.12 | | 111 | 101 | 121 |
| A3-7 | | | 0.075 | 1.0 | 110 | 101 | 120 |
| A3-8 | | | | 3.0 | 110 | 102 | 124 |
| A3-9 | | | 0.18 | 2.0 | 110 | 100 | 108 |
| A3-10 | | | 0.075 | 0.5 | 107 | 101 | 110 |
| R3-1 | | | 0.23 | 2.0 | 109 | 100 | 97 |
| R3-2 | | | 0.075 | 0.2 | 107 | 100 | 98 |
| B1-1 | b1 | 0 | 0.075 | 2.0 | 98 | 91 | 96 |
| B1-2 | | 0.6 | | | 100 | 100 | 100 |
| B1-3 | | 0.8 | | | 101 | 101 | 101 |
| B1-4 | | 1.0 | | | 101 | 102 | 103 |
| B1-5 | | 1.5 | | | 102 | 103 | 104 |
| B1-6 | | 3.0 | | | 102 | 104 | 103 |

TABLE 1-continued

| Battery | Organic expander | barium sulfate [mass %] | Positive current collector Ca content [mass %] | Positive current collector Sn content [mass %] | Initial performance Low-temperature HR discharge performance [%] | Initial performance Charge acceptability [%] | After charge-discharge cycle Low-temperature HR discharge performance [%] |
|---|---|---|---|---|---|---|---|
| B1-7 | | 0.8 | 0.04 | | 101 | 101 | 102 |
| B1-8 | | | 0.12 | | 102 | 100 | 100 |
| B1-9 | | | 0.075 | 1.0 | 101 | 102 | 100 |
| B1-10 | | | | 3.0 | 102 | 101 | 102 |
| B1-11 | | | 0.18 | 2.0 | 102 | 101 | 97 |
| B1-12 | | | 0.075 | 0.5 | 99 | 102 | 99 |
| B1-13 | | | 0.23 | 2.0 | 102 | 102 | 90 |
| B1-14 | | | 0.075 | 0.2 | 99 | 101 | 95 |
| B2 | b2 | 0.8 | 0.075 | 2.0 | 105 | 103 | 119 |

As shown in Table 1, in the lead-acid battery using the first organic expanders a1 to a3, the low-temperature HR discharge performance after a charge-discharge cycle is remarkably improved as compared with the lead-acid battery using the condensate of sodium ligninsulfonate or bisphenol A. In the lead-acid battery using sodium ligninsulfonate, even when the content of Ca, the content of Sn, or the content of barium sulfate in the positive current collector is changed, the change in the low-temperature HR discharge performance after a charge-discharge cycle is 4% or less. On the other hand, in the lead-acid battery using the first organic expander, the low-temperature HR discharge performance after a charge-discharge cycle is greatly improved to 8% to 50%.

When the content of Ca in the positive current collector is 0.2% by mass or less, the low-temperature HR discharge performance after a cycle is remarkably improved as compared with the case where the content of Ca in the positive current collector exceeds 0.2% by mass. Similarly, the low-temperature HR discharge performance after a cycle is remarkably improved even when the Sn content in the positive current collector is 0.5% by mass or more as compared with the case where the Sn content in the positive current collector is less than 0.5% by mass. In addition, it can be said that such an improving effect is not obtained when sodium ligninsulfonate is used, and is an effect specific to the first organic expander.

When sodium ligninsulfonate is used, the charge acceptability and the low-temperature HR discharge performance after a charge-discharge cycle hardly change even when the content of barium sulfate increases from 0.6% by mass to 0.8% by mass. However, when the first organic expander is used, when the content of barium sulfate is from 0.6% by mass to 0.8% by mass, the charge acceptability and the low-temperature HR discharge performance after a charge-discharge cycle greatly increase. Therefore, the content of barium sulfate is preferably 0.8% by mass or more from the viewpoint of securing higher charge acceptability and low-temperature HR discharge performance after a charge-discharge cycle.

INDUSTRIAL APPLICABILITY

The negative electrode plate and the lead-acid battery according to one aspect of the present invention are applicable to valve regulated and flooded-type lead-acid batteries. The lead-acid battery can be suitably used as, for example, a power source for starting an automobile, a motorcycle, or the like, a natural energy storage device, and a power source of an industrial energy storage apparatus such as an electric vehicle (forklift or the like). Note that these applications are merely illustrative and not limited to these applications.

DESCRIPTION OF REFERENCE SIGNS

1: Lead-acid battery
2: Negative electrode plate
3: Positive electrode plate
4: Separator
5: Positive electrode shelf part
6: Negative electrode shelf part
7: Positive pole
8: Penetrating connection body
9: Negative pole
11: Element
12: Container
13: Partition
14: Cell chamber
15: Lid
16: Negative electrode terminal
17: Positive electrode terminal
18: Vent plug

The invention claimed is:

1. A lead-acid battery comprising a positive electrode plate, a negative electrode plate, and an electrolyte solution, wherein the positive electrode plate includes a positive current collector and a positive electrode material, the negative electrode plate includes a negative current collector and a negative electrode material, the positive current collector contains a lead alloy containing Ca and Sn, a content of Ca in the positive current collector is 0.2% by mass or less, and a content of Sn is 0.5% by mass or more, and the negative electrode material contains a first organic expander (excluding a lignin compound) containing at least one selected from the group consisting of a unit of a monocyclic aromatic compound and a unit of a bisphenol S compound.

2. The lead-acid battery according to claim 1, wherein a content of Ca in the positive current collector is 0.14% by mass or less.

3. The lead-acid battery according to claim 1, wherein a content of Ca in the positive current collector is 0.12% by mass or less.

4. The lead-acid battery according to claim 1, wherein a content of Sn in the positive current collector is 0.8% by mass or more.

5. The lead-acid battery according to claim 1, wherein a content of Sn in the positive current collector is 1.0% by mass or more.

6. The lead-acid battery according to claim 1, wherein the negative electrode material further contains barium sulfate.

7. The lead-acid battery according to claim 6, wherein a content of the barium sulfate in the negative electrode material is 0.6% by mass or more.

8. The lead-acid battery according to claim 1, wherein the first organic expander contains the unit of a monocyclic aromatic compound, and the unit of a monocyclic aromatic compound contains at least a unit of phenolsulfonic acid.

9. The lead-acid battery according to claim 1, wherein the first organic expander contains the unit of a monocyclic aromatic compound and a unit of a bisarene compound, and the unit of a bisarene compound is at least one selected from the group consisting of a unit of a bisphenol S compound and a unit of a bisphenol A compound.

10. The lead-acid battery according to claim 9, wherein the unit of a bisarene compound includes at least the unit of a bisphenol S compound.

11. The lead-acid battery according to claim 1, wherein the first organic expander contains the unit of a bisphenol S compound and a unit of a bisphenol A compound.

12. The lead-acid battery according to claim 11, wherein in the first organic expander, a molar rate of the unit of a bisphenol S compound to a total amount of the unit of a bisphenol S compound and the unit of a bisphenol A compound is 40 mol % or more.

13. The lead-acid battery according to claim 1, wherein a content of Ca in the positive current collector is 0.01% by mass or more.

14. The lead-acid battery according to claim 1, wherein a content of Sn in the positive current collector is 5% by mass or less.

15. The lead-acid battery according to claim 6, wherein a content of the barium sulfate in the negative electrode material is 0.05% by mass or more and 5% by mass or less.

16. The lead-acid battery according to claim 1, wherein the first organic expander includes a first unit that is a unit of a monocyclic aromatic compound and a second unit that is a unit of another aromatic compound.

17. The lead-acid battery according to claim 16, wherein a molar rate of the first unit to a total amount of the first unit and the second unit is 10 mol % or more and 90 mol % or less.

18. The lead-acid battery according to claim 11, wherein a molar rate of the unit of a bisphenol S compound to a total amount of the unit of a bisphenol S compound and the unit of a bisphenol A compound is 10 mol % or more and 90 mol % or less.

19. The lead-acid battery according to claim 1, wherein the first organic expander has a sulfur element content of 300 µmol/g or more and 8000 µmol/g or less.

20. The lead-acid battery according to claim 1, wherein the first organic expander has a sulfur element content of 300 µmol/g or more and less than 2000 µmol/g.

21. The lead-acid battery according to claim 1, wherein the organic expander has a weight average molecular weight (Mw) of 7000 or more and 20,000 or less.

22. The lead-acid battery according to claim 1, wherein the negative electrode material further contains a carbonaceous material.

23. The lead-acid battery according to claim 22, wherein a content of the carbonaceous material in the negative electrode material is 0.05% by mass or more and 5% by mass or less.

* * * * *